United States Patent Office 3,347,854
Patented Oct. 17, 1967

3,347,854
PREPARATION OF 11β-HYDROXY-19-NOR STEROIDAL-$\Delta^{1,3,5(10),6,8}$-PENTAENES
Robert Herman Lenhard, Ridgefield Park, N.J., and Milton Heller and Seymour Bernstein, New City, N.Y., assignors to American Cyanamid Company, Stamford, Conn., a corporation of Maine
No Drawing. Filed Jan. 10, 1966, Ser. No. 519,522
10 Claims. (Cl. 260—239.55)

This invention relates to new steroid compounds. More particularly, it relates to 19-nor steroids and methods of preparing the same.

The novel compounds of the present invention may be illustrated by the following formula:

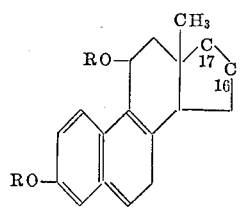

wherein R is selected from the group consisting of hydrogen and lower alkanoyl and

is selected from the group consisting of:

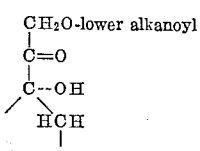

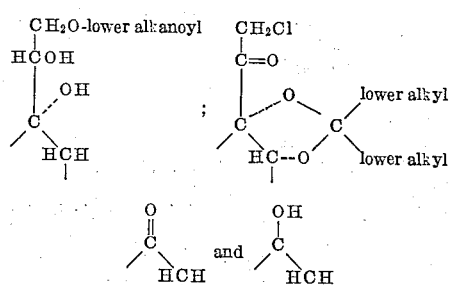

The compounds of the present invention are crystalline solids which are substantially insoluble in water and somewhat soluble in organis solvents such as acetone, petroleum ether and the like.

Many of the compounds of the present invention can be prepared from, for example, 21-acetoxy19α-bromo-11β,17α-dihydroxypregna-1,4,6-triene-3,20-dione (German Patent 1,046,042) by heating with an organic alkaline reagent and other reactions described hereinafter. Other compounds can be prepared from 21-chloro-16α,17α-lower alkylidienedioxypregna - 1,4,6,9(11)tetrane - 3,20 - dione (Steroids 5, 615 (May 1965)), as described hereinafter.

The following flowsheet shows schematically the various compounds of the present invention.

FLOWSHEET

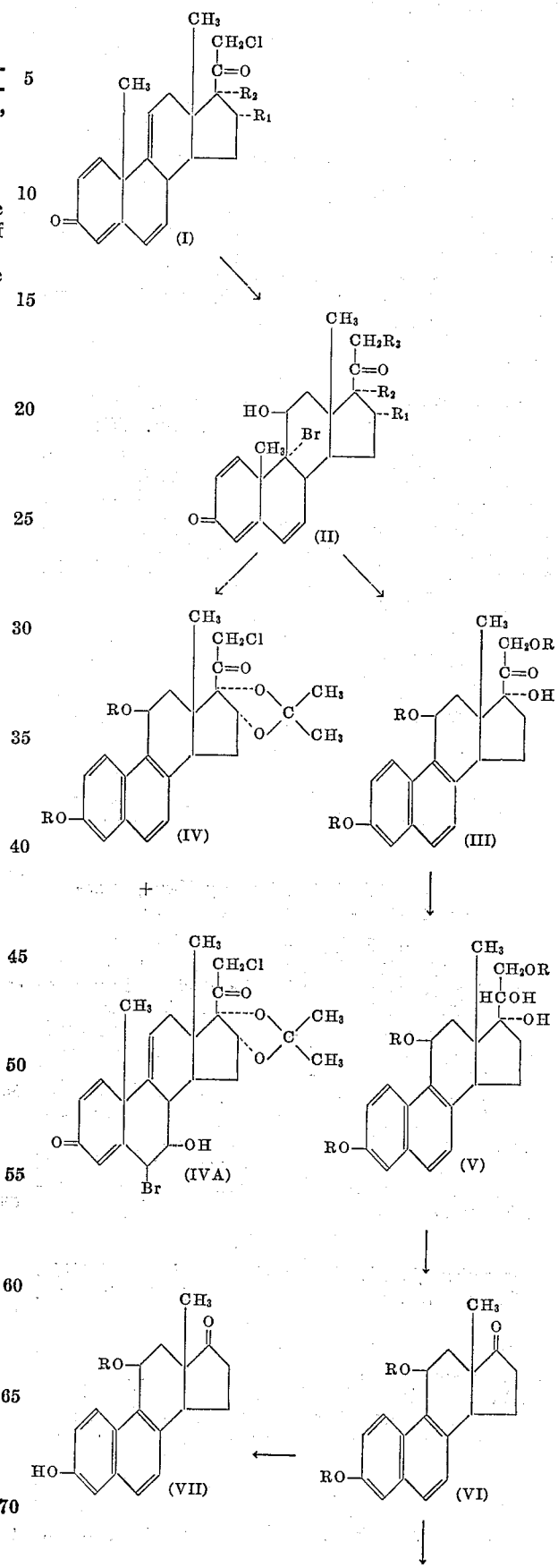

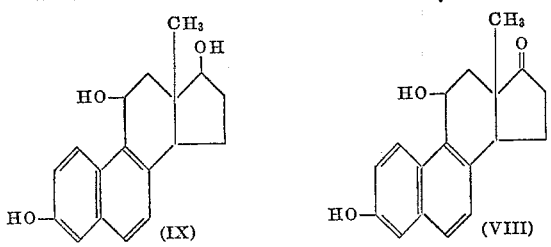

wherein R is as defined hereinbefore, $R_1$ is hydrogen, $R_2$ hydrogen or hydroxy, $R_1$ and $R_2$ taken together are lower alkylidenedioxy and $R_3$ is chloro or lower alkanoyloxy.

The compounds of the present invention are physiologically active in lowering blood cholesterol in rats. They are therefore useful as hypochloesterolemic agents.

The following examples illustrate in detail the preparation of representative 19-nor steroids of the present invention.

EXAMPLE 1

Preparation of 3,11β,21-triacetoxy-17α-hydroxy-19-norpregna-1,3,5(10),6,8-pentaen-20-one. (III)

A solution of 21-acetoxy-9α-bromo-11β,17α-dihydroxypregna - 1,4,6 - triene - 3,20 - dione (II) (German Patent 1,046,042) (4.89 g.) in pyridine (50 ml.) is refluxed for 20 minutes. The cooled reaction mixture is poured into ice water (ca. 2 l.), allowed to stand overnight at 5° C., filtered and washed with water to afford 2.97 g. of solid. The crude product in pyridine (10 ml.) and acetic anhydride (5 ml.) is acetylated at room temperature for 20 hours. The reaction mixture is poured into ice water and the precipitated solid (3.4 g.) is collected, dissolved in methylene chloride (ca. 30–40 ml.) and absorbed on a column of synethetic magnesium silicate (300 g.). Elution with 20% acetone-petroleum ether (B.P. 30°–60° C.) (2×500 ml. fractions) gives 2.35 g. of the triacetate as a pale yellow glass. The analytical sample is obtained as a white amorphous solid, melting point ca. 90–130° C. after thin layer chromatography on silica gel.

EXAMPLE 2

Preparation of 3,11β,21-triacetoxy-19-norpregna-1,3,5(10),6,8-pentaene-17α,20ξ-diol. (V)

A solution of 3,11β,21 - triacetoxy-17α-hydroxy-19-norpregna-1,3,5(10),6,8-pentaen-20-one (III) (1.51 g.) in tetrahydrofuran (40 ml.) is reduced with sodium borohydride (51 mg.) in water (0.4 ml.). After standing at room temperature for 1¼ hours the reaction mixture is acidified with glacial acetic acid (10 drops) and evaporated. The residue is triturated with water to give a solid (1.34 g., melting point 93–108° C. with effervescence) which dissolves in methanol (ca. 5 ml.) and precipitates as a crystalline solid (0.56 g., melting point 168.5–176.5° C.). Recrystallization from methanol gives 0.44 g. of product, melting point 153°–168° C. An additional crystallization does not alter the wide range melting point.

EXAMPLE 3

Preparation of 3,11β-diacetoxy-19-norandrosta-1,3,5(10), 6,8-pentaen-17-one, (11β-hydroxyequilenin diacetate). (VII)

To a solution of 3,11β,21-triacetoxy-19-norpregna-1,3, 5(10),6,8-pentaene-17α,20ξ-diol (V) (0.30 g.) in methanol (10 ml.) is added a solution of sodium metaperiodate (0.445 g.) in water (5 ml.). The reaction mixture is allowed to stand at room temperature for 22 hours, water is added and the product is filtered and washed with water to give 0.18 g. melting point 163°–173° C. The crude product is dissolved in benzene and adsorbed on silica gel (10 g.). Elution with 5% ethyl acetate-benzene (7×5 ml. fractions) gives 118 mg. of material which after crystallization from ether and several crystallizations from acetone-hexane affords pure product, melting point 186°–189.5° C.

EXAMPLE 4

Preparation of 3,11β - dihydroxy - 19 - norandrosta-1,3,5 (10),6,8 - pentaen - 17 - one (11β-hydroxyequilenin). (VIII)

A solution of 3,11β - diacetoxy-19-norandrosta-1,3,5 (10),6,8-pentaen-17-one (VI) (278 mg.) in 5% potassium hydroxide-methanol (10 ml.) is purged with argon and refluxed for 20 minutes. The blue solution is cooled and neutralized with 5% hydrochloric acid (pink at end point). Water is added and the product is filtered and washed with water to give 197 mg., melting point 217.5°–218° C. red melt. Two crystallizations from methanol and three from acetone-hexane gives the analytical sample, melting point 253°–255° C., red melt.

EXAMPLE 5

Preparation of 11β-acetoxy - 3 - hydroxy-19-norandrosta-1,3,5(10),6,8 - pentaen-17-one (11β-acetoxyequilenin). (VII)

A solution of 3,11β-diacetoxy-19-norandrosta 1,3,5 (10),6,8-pentaen-17-one (VI) (42 mg.) in methanol (2 ml.) is treated with a solution of sodium (5.8 mg.) in methanol (0.78 ml.) at room temperature for 10 minutes. The blue solution is acidified with a drop of glacial acetic acid (solution turns red) and the methanol is evaporated under reduced pressure. Water is added and the product is filtered and washed with water to afford 24 mg., melting point 190°–193° C. red melt. Recrystallization from acetone-hexane gives 14 mg. of product, melting point 208°–210° C. red melt.

EXAMPLE 6

Preparation of 19 - norandrost - 1,3,5(10),6,8-pentaene-3,11β,17β - triol (11β-hydroxy-17β-dihydroequilenin). (IX)

A suspension of 3,11β-dihydroxy-19-norandrosta-1,3,5 (10)6,8-pentaen-17-one (VIII) (133 mg.) and sodium borohydride (133 mg.) in absolute ethanol (5 ml.) and water (0.5 ml.) is swirled at room temperature for 30 minutes. The reaction mixture is neutralized with 1.0 N sulfuric acid, diluted with water, cooled, filtered and washed with water to give 48 mg. of product, melting point 185.5°–191° C. The filtrate is salted out and the precipitated product is filtered and washed with saturated saline. Trituration with hot acetone (ca. 15 ml.), followed by filtration and evaporation affords an additional 69 mg. of crude product. Both fractions are combined and placed on a preparative thin layer chromatography plate (silica gel-20 cm. x 20 cm. x 1 mm.) and developed 1 hour in the system benzene: acetone:water (1:2:2) (upper phase). The band containing the desired product (ca. 4.5 to 10 cm. from the origin) is scraped from the plate and eluted from the silica gel with acetone. This gives after removal of the solvent 107 mg. of the triol. Crystallization from acetone-hexane affords 79 mg. of solvated product, melting point 177°–180° C. with effervescence. One additional crystalliaztion from the same solvents does not alter the melting point. After drying in vacuo at 80° C. overnight the compound melts at 179.5–180° C., solidifies at 185° C. and remelts at 207.5–212° C.

EXAMPLE 7

Preparation of 9α - bromo -21 - chloro - 11β - hydroxy-16α,17α - isopropylidinedioxypregna - 1,4,6 - triene-30, 20-dione. (II)

A stirred solution of 21-chloro-16α,17α-isopropylidine dioxypregna-1,4,6,9(11)-tetraene-3,20-dione (Steroids 5, 615 (May 1965)) (I) (1.0 g.) in methylene chloride (20 ml.) and t-butanol (40 ml.) is treated at room temperature with N-bromoacetamide (0.367 g. in t-butanol (10 ml.) and 72% perchloric acid (3.1 ml.) in water (24 ml.). After 15 minutes a solution of sodium sulfite (0.367 g.) in water (25 ml.) is added and the reaction mixture is concentrated under reduced pressure (bath temperature not over 50° C.). Water is added and the precipitated solid is filtered and washed with water to afford 1.25 g. of a mixture of the 9α-bromo-11β-hydroxy-1,4,6-triene and 6β-bromo-7α-hydroxy-1,4,9(11)-triene. The latter, more insoluble compound, is removed by crystallization from acetone. The mother liquor is evaporated and the residue is triturated with warm methanol and filtered to remove a further amount of the 6β-bromo-7α-hydroxy-compound. The filtrate is evaporated to afford the product, $\lambda_{max}$. 231 mμ (ε10,000), 254 mμ (ε8,880) (inflection), and 300 mμ (ε11,200).

EXAMPLE 8

*Preparation of 3,11β-diacetoxy-21-chloro-16α,17α-isopropylidenedioxy - 19 - norpregna - 1,3,5(10),6,8-pentaen-20-one. (IV)*

A solution of 9α - bromo - 21-chloro-11β-hydroxy-16α,17α-isopropylidenedioxypregna - 1,4,6 - triene - 3,20-dione (II) (94 mg.) in s-collidine (2 ml.) is refluxed for 15 minutes. After cooling to room temperature, the precipitated collidine hydrobromide is removed by filtration and washed with ether. The filtrate is evaporated and the residue triturated with hexane and cooled. The hexane is decanted and the residue is crystallized from ether-hexane to afford 20 mg. of solid, melting point 85°–190° C. A portion (17 mg.) is dissolved in pyridine (1 ml.) and acetic anhydride (0.5 ml.) and allowed to stand at room temperature for 22 hours. The reaction mixture is poured into ice water and the product filtered and washed with water to give 21 mg., melting point 99°–120° C. One crystallization from ethanol-water affords 9 mg. of the diacetate melting at 120°–130° C.

We claim:
1. A pentaene steroid of the formula:

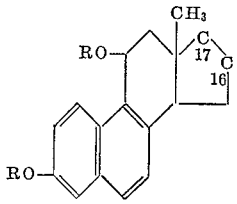

wherein R is selected from the group consisting of hydrogen and lower alkanoyl and

is selected from the group consisting of:

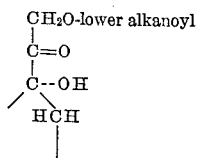

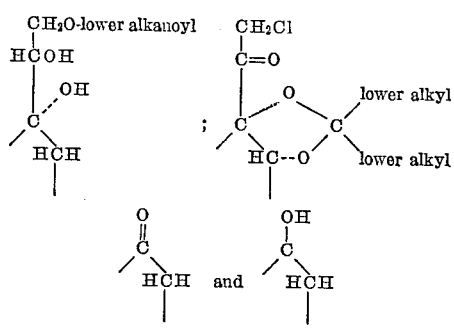

2. A compound in accordance with claim 1 wherein the pentaene steroid is 3,11β,21-triacetoxy-17α-hydroxy-19-norpregna 1,3,5(10),6,8-pentaen-20-one.
3. A compound in accordance with claim 1 wherein the pentaene steroid is 3,11β,21-triacetoxy-19-norpregna-1,3,5(10),6,8-pentaene-17α,20ξ-diol.
4. A compound in accordance with claim 1 wherein the pentaene steroid is 3,11β-diacetoxy-19-norandrosta-1,3,5(10),6,8-pentaen-17-one.
5. A compound in accordance with claim 1 wherein the pentaene steroid is 3,11β-dihydroxy-19-norandrosta-1,3,5(10),6,8-pentaen-17-one.
6. A compound in accordance with claim 1 wherein the pentaene steroid is 11β-acetoxy-3-hydroxy-19-norandrosta-1,3,5(10),6,8-pentaen-17-one.
7. A compound in accordance with claim 1 wherein the pentaene steroid is 19-norandrosta-1,3,5(10),-6,8-pentaene-3,11β,17β-triol.
8. A compound in accordance with claim 1 wherein the pentaene steroid is 3,11β-diacetoxy-21-chloro-16α,17α-isopropylidenedioxy - 19 - norpregna-1,3,5(10)-6,8-pentaen-20-one.
9. A method of preparing pentaene steroids of the formula:

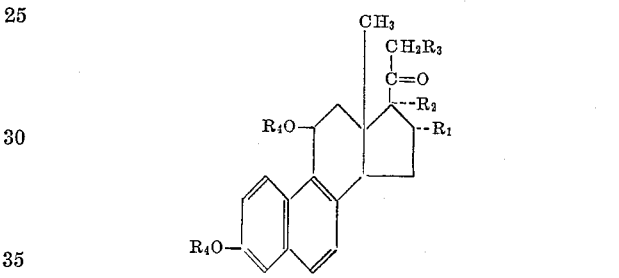

wherein $R_1$ is hydrogen, $R_2$ is hydroxy, $R_1$ and $R_2$ taken together are lower alkylidenedioxy, $R_3$ is selected from the group consisting of chloro and lower alkanoyloxy and $R_4$ is lower alkanoyloxy which comprises heating a steroid of the formula:

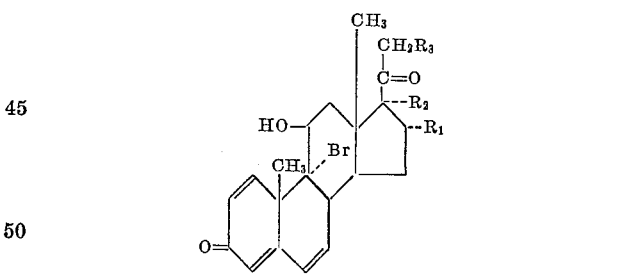

wherein $R_1$, $R_2$ and $R_3$ are as defined above, with an organic alkaline agent and subsequently treating the reaction product with a lower alkanoic acid anhydride and recovering said compound therefrom.
10. A method in accordance with claim 9, in which the pentaene steroid is 3,11β,21-triacetoxy-17α-hydroxy-19-norpregna-1,3,5(10),6,8-pentaen-20-one and the starting material is 21-acetoxy-9α-bromo-11β,17α-dihydroxy-pregna-1,4,6-triene-3,20-dione.

References Cited

UNITED STATES PATENTS 2,885,413   5/1959   Hogg et al. _____ 260—397.45
3,040,037   6/1962   Tsuda et al. _____ 260—239.55

OTHER REFERENCES

Fieser et al.: Steroids, N.Y., Reinhold, 1959, pp. 477 and 478.

Heller et al.: J. Amer. Chem. Soc., 86, 2309 and 2310 (1964).

LEWIS GOTTS, *Primary Examiner.*

T. MESHBESHER, *Assistant Examiner.*